US012637335B2

(12) United States Patent
Assfalg

(10) Patent No.: US 12,637,335 B2
(45) Date of Patent: May 26, 2026

(54) POSITION-VARIABLE CONTROL AND/OR STAFF CABIN CRANE

(71) Applicant: Liebherr-Werk Biberach GmbH, Biberach an der Riss (DE)

(72) Inventor: Martin Assfalg, Attenweiler (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 330 days.

(21) Appl. No.: 18/365,930

(22) Filed: Aug. 4, 2023

(65) Prior Publication Data

US 2024/0034602 A1 Feb. 1, 2024

Related U.S. Application Data

(63) Continuation of application No. PCT/EP2022/052727, filed on Feb. 4, 2022.

(30) Foreign Application Priority Data

Feb. 5, 2021 (DE) ..................... 10 2021 102 699.7

(51) Int. Cl.
*B66C 23/90* (2006.01)
*B66C 13/46* (2006.01)

(52) U.S. Cl.
CPC ............ *B66C 23/905* (2013.01); *B66C 13/46* (2013.01)

(58) Field of Classification Search
CPC ......... B66C 13/46; B66C 15/00; B66C 23/90; B66C 23/905
See application file for complete search history.

(56) References Cited

U.S. PATENT DOCUMENTS 3,767,061 A * 10/1973 Tax .......................... B66C 23/90 212/276
6,744,372 B1 * 6/2004 Shaw ...................... B66C 15/06 340/685
2019/0185298 A1 * 6/2019 Mietschnig ............. B66C 13/16

FOREIGN PATENT DOCUMENTS

| | | |
|---|---|---|
| DE | 20203686 U1 | 7/2002 |
| DE | 102016104358 | 9/2017 |
| DE | 102017113386 | 12/2018 |
| DE | 102018129352 | 5/2020 |
| EP | 1221426 | 7/2002 |
| EP | 2847121 B1 | 10/2015 |
| EP | 3428112 | 1/2019 |

(Continued)

OTHER PUBLICATIONS

WO 2014/161636 A1 Machine Translation (Year: 2014).*

*Primary Examiner* — Robert W Hodge
*Assistant Examiner* — Juan J Campos, Jr.
(74) *Attorney, Agent, or Firm* — Levine Bagade Han LLP

(57) ABSTRACT

The present invention relates to a crane, for example in the form of a fast-erecting crane comprising a telescopic and/or luffing tower, having a crane controller for controlling crane movements by means of drive devices, wherein the crane controller has a monitoring device for monitoring stability and limiting crane movements if a load limit is reached. According to the invention, the monitoring device has a wind resistance detection unit for detecting at least one variable wind resistance parameter which influences the wind resistance of the crane, and is designed to change the load limit depending on the detected wind resistance parameter and/or to consider different load limits depending on said wind resistance parameter.

18 Claims, 2 Drawing Sheets

(56) References Cited

FOREIGN PATENT DOCUMENTS

| | | | | |
|---|---|---|---|---|
| WO | WO-2014161636 A1 * | 10/2014 | ............. | B66C 23/90 |
| WO | WO 2022/167589 | 8/2022 | | |

* cited by examiner

POSITION-VARIABLE CONTROL AND/OR STAFF CABIN CRANE

CROSS-REFERENCE TO RELATED APPLICATIONS

This application is a continuation of International Patent Application Number PCT/EP2022/052727 filed Feb. 4, 2022, which claims priority to German Patent Application Number DE 10 2021 102 699.7 filed Feb. 5, 2021, both of which are incorporated herein by reference in their entireties.

BACKGROUND

The present invention relates to a crane, for example in the form of a fast-erecting crane comprising a telescopic and/or luffing tower, having a crane controller for controlling crane movements by means of drive devices, wherein the crane controller has a monitoring device for monitoring stability and limiting crane movements if a load limit is reached.

In cranes such as construction cranes, for example mobile cranes or tower revolving cranes, it is usually monitored by means of a crane controller or a monitoring device implemented therein whether the stability of the crane is ensured or the crane load reaches a critical load limit, so that the crane is at risk of falling over or is jeopardized otherwise, in order to then, if necessary, switch off the corresponding drive devices of the crane in time.

In particular, the hoisting load and the unloading of the hoisting load can be monitored, which can be done, for example, by determining the tensile force acting on the hoisting cable or a torque induced by this on the hoisting cable winch, and—as far as the outreach is concerned—by the position of a trolley or retracted trolley cable length. In dependence on the crane type, however, said variables can also be determined in a different way, wherein, for example, in the case of cranes having a luffable boom, the outreach can be determined via the luffing angle and, where necessary, telescopingly withdrawn boom length in each case. With the determination of the hoisting load and the outreach thereof, as a result, there can be determined a lifting torque acting on the crane, which can be compared to a corresponding load limit in the form of a limit torque, in order to ensure the stability of the crane. In principle, however, said lifting torque can also be determined in another way, for example by sensory detection of bending deformations of the tower, tensile stresses in the tower chords or in a guying or also the load on support feet.

However, it is not only the lifting torque that can jeopardize the stability, but also excessive loads themselves, which, if the trolley is moved very far inward or the outreach is very small, are not critical in terms of lifting torque, but can lead to structural failure.

If the monitoring device detects that a load that is generally too heavy is being lifted and/or that a certain hoisting load is being moved too far outward so that the outreach for this load becomes too great, the crane controller can stop the hoist drive and, if necessary, also other drives such as the trolley drive or the luffing drive in order to ensure the stability of the crane, in particular not to permit any further crane movements that would put the stability at further risk.

However, the stability of a crane does not depend exclusively on said variables of hoisting load and outreach, but is also influenced by other variables, for example dynamic variables such as motion speed and acceleration. In order to maximize the bearing load and stability reserves of a crane without compromising safety, it has already been suggested that different load limits should be used or that the crane movements should be successively curtailed, the smaller the stability reserves become. For example, document EP 2 847 121 B1 describes a tower revolving crane that operates with a total of three load limits in the form of the so-called bearing load curves. If a first load limit is reached or exceeded, all crane movements can still be performed, but only at reduced speed and acceleration. If a second load limit is overtravelled the crane drives can only be actuated individually until a third load limit is finally reached at which the individual operation of a drive is also switched off or only such movements are permissible that increase stability again.

Furthermore, considerations have already been made to take into account the setup status of a crane and to provide or select different load limits, for example in the form of bearing load curves, depending on the equipment with which the crane is equipped. For example, a reduced load limit only can be selected if the crane is erected with a reduced ballast only, or a higher bearing load curve can be provided if the crane is erected without an operator's cabin. The different load limits can, for example, be stored in a programmable-logic controller so that they can then be enabled depending on the set-up status.

Against this background, it is the object of the present invention to provide an improved crane of the aforementioned type, which avoids the disadvantages of the prior art and develops the latter in an advantageous manner. In particular, a further increase in bearing load and/or performance is to be achieved and the highest possible bearing loads and travel speeds are to be permissible without jeopardizing stability.

SUMMARY

Said task is solved, according to the invention, with a crane according as claimed in claim 1. Preferred embodiments of the invention are the subject-matter of the dependent claims.

It is therefore proposed to adjust the at least one load limit relevant for limiting crane movements to the wind resistance of the crane, which may vary depending on the set-up and/or operating condition of the crane. If the crane is in a so to speak wind-susceptible set-up and/or operating condition, in which strong wind is less likely to affect the crane and its stability, the load limit can be increased, while a lower load limit can be useful if the crane is in a set-up and/or operating condition in which the crane has a higher wind resistance and catches the wind more strongly or is in a state in which a higher wind or tilting moment is exerted on the crane by the wind.

According to the invention, the monitoring device has a wind resistance detection unit for detecting at least one variable wind resistance parameter which influences the wind resistance of the crane, and is designed to change the load limit depending on the detected wind resistance parameter and/or to consider different load limits depending on said wind resistance parameter. This allows the susceptibility of the crane to wind loads to be considered more accurately and the stability of the crane to be better utilized without compromising it. If the detection unit determines a smaller wind resistance of the crane, the load limit can be increased or there can be selected a load limit with smaller movement limitations. Said load limit can also be a limit for the permissible wind load so that higher wind speeds can be permitted when the crane is in a more wind-sensitive set-up and/or operating condition. Alternatively or additionally, however, said load limit can also be a limit for the load torque and/or the bearing load, which, when reached or exceeded, restricts or switches off crane movements or drive devices of the crane.

In an advantageous further development of the invention, said wind resistance detection unit can determine the presence and/or the position of a crane element or attachment relevant for wind, so that the monitoring device can change the load limit and/or consider different load limits depending on the presence and/or depending on the position of one or more wind catching components. Such crane elements or attachments relevant for the wind resistance can in particular be large-surface and/or closed-surface attachments, especially upright ones, whose wind resistance is relatively high in regard to the structural parts of the crane, which are often designed as trusses or support profiles.

In particular, the wind resistance detection unit can detect large-surface, upright components with a low c, or wind resistance coefficient, especially with regard to a possibly variable position on the crane structure.

In particular, the wind resistance detection unit can include position determination means for determining a height and/or distance of the component relevant for the wind in relation to a tilt axis of the crane, so that the monitoring device can adjust said load limit depending on the determined height and/or the determined tilt axis distance. Said tilt axis can be defined, for example, by the support feet of the crane or, in general, by edge points of a contact surface, or it can also be estimated approximately. In principle, the monitoring device can be designed to lower the load limit depending on how high and/or how far away from the tilt axis the component relevant for the wind is located. Taking into account the height of a component relevant for the wind is based on the consideration that the same component, if placed relatively low, will have relatively little adverse effect on the stability of the crane, since the lever arm for the wind force and thus the wind-induced or tilting moment is relatively small, whereas the same component, at the same wind force, will cause a significantly higher wind-induced tilting moment if it is arranged at a higher level.

In an advantageous further development of the invention, the wind resistance detection unit may also comprise sizing means for determining the size of the cross-sectional area of the component relevant to the wind resistance when components of different sizes may be attached to the crane and/or arranged in different positions, as is the case, for example, with advertising panels or coverings.

In particular, the wind resistance detection unit may be designed to detect the presence and/or position of a control and/or crane operator's cabin, for example in the form of a crane operator's cabin. Depending on the detected control and/or staff cabin and/or depending on the detected position of the cabin or control station, the monitoring device can increase or decrease the at least one load limit for limiting crane movements.

In particular, the crane can have a position-variable control and/or staff cabin, for example in the form of a crane operator's cabin. The position determination means can detect the respective position of the control and/or staff cabin, wherein the monitoring device can increase or decrease said load limit depending on the detected position of the control and/or staff cabin.

For example, the crane may have a height-adjustable control and/or operator station that can for example be moved up and down along a crane tower. Alternatively or additionally, a control and/or staff cabin can be provided, which can for example be moved along a boom of the crane. The wind resistance detection unit determines the position, in particular the height position of the control and/or staff cabin and reports this to the monitoring device, which then adjusts the load limit depending on the determined position. In particular, the load limit can be lowered the higher the control and/or staff cabin is arranged.

Alternatively or additionally, the wind resistance detection unit can also comprise advertising space detection means for detecting the presence and/or position of an advertising space, which can be designed, for example, in the form of an advertising panel and/or a stretched advertising cloth or banner. Such advertising spaces are often mounted on higher sections of crane towers or even on a crane boom in order to be clearly visible from a distance. However, such advertising panels or spaces mounted high up, often of large surface, markedly increase the wind resistance of the crane, so that it is reasonable to reduce the load limit if such large advertising spaces are mounted at greater heights on the crane, while vice versa an increased or pushed out load limit can be applied if such large-surface advertising banners mounted relatively high up do not exist.

In further aspects of the invention, the wind resistance detection unit may also include orientation determination means capable of determining or considering the orientation of a wind-related component relative to an upright longitudinal central plane of the crane and/or relative to a vertical. For wind resistance, for example, large upright advertising spaces that extend essentially parallel to the longitudinal central plane of the crane passing upright through the crane boom and catch wind transverse to said longitudinal central plane of the of the crane may be more critical, since cranes are regularly very sensitive to transverse loads or the ballast is hardly effective against such transverse loads. On the other hand, the crane can better cope with corresponding advertising spaces or wind capture areas if they are positioned at right angles to said longitudinal central plane of the crane or at a flatter angle with respect to the vertical.

In this respect, the monitoring device can adjust the load limit depending on the determined orientation of the wind capture area and/or the component relevant for the wind with respect to the vertical and/or with respect to the upright longitudinal central plane of the crane.

Said wind resistance detection unit can advantageously be designed to operate semi-automatically and/or fully automatically. In the case of semi-automatically designed equipment, for example, confirmation can be requested by the crane operator and/or fitter, wherein such a request can be provided automatically, for example on a display of the crane controller. For example, such a confirmation prompt may include the question "Crane cab up or down?" if the crane cab can only be arranged in two positions on the tower. Alternatively or additionally, for example, a crane display can be shown on a touchscreen display and a prompt displayed "Please tap the position of the advertising panel", whereupon the crane operator or fitter can then tap the mounting position of the advertising panel. Depending on the input signal following such a query, the monitoring device can then adjust the load limit, in particular increase or decrease it, depending on whether and at what position a component relevant for the wind is arranged.

However, in order to enable even simpler operation and/or to detect possible adjustments even during crane operation, the wind resistance detection unit can also be designed to operate fully automatically and have a sensory system that can continuously or cyclically detect the position of a position-variable, component relevant for the wind such as the operator's cabin or a control stand, so that depending on a signal from the wind resistance detection unit, the monitoring device can adjust the load limit continuously or cyclically.

However, fully automatic detection can also consist of the attachment of a component relevant for the wind, such as an advertising panel on the crane tower or boom, being automatically detected by a sensory system and reported to the monitoring device, which then adjusts the load limit accordingly.

BRIEF DESCRIPTION OF THE DRAWINGS

The invention is explained in more detail below with reference to a preferred embodiment and associated drawings. The drawings show.

DETAILED DESCRIPTION

Figure 1:
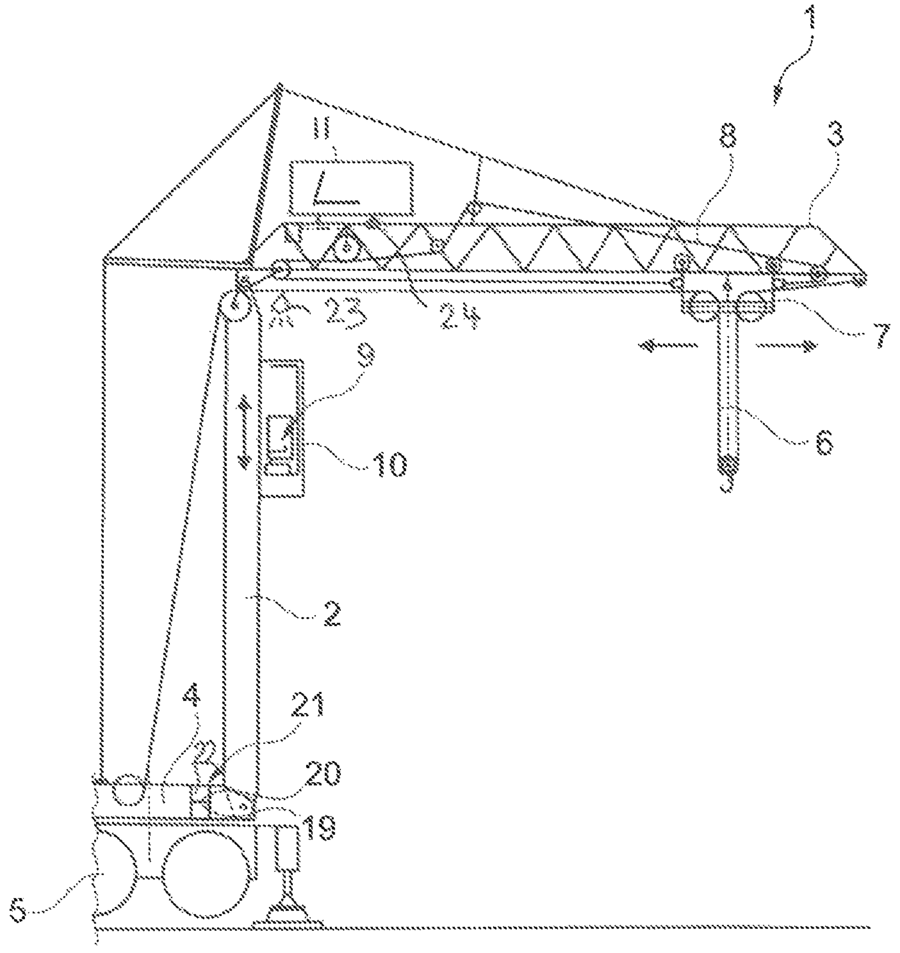
FIG. 1: is a schematic side view of a fast-erecting crane designed as a tower revolving crane according to an advantageous embodiment of the invention, the operator's cabin of which is mounted on the tower of the crane in a height-adjustable manner, FIG. 2 a hoisting load/outreach diagram showing several load limits in the form of different limiting load curves and the different load ranges defined thereby, in which the crane controller provides different limitations of the crane movements in different operating modes.

As FIG. 1 shows, the crane 1 can be designed as a tower revolving crane and have a tower 2 that is upright in operation and carries a cantilevered boom 3. The tower 2 can be seated with its lower end on a rotating platform 4, which is rotatable about an upright axis and supported on an undercarriage 5, which can be designed as a truck or otherwise movable, but can optionally also form a rigid, non-displaceable support base.

A trolley 7 can be mounted longitudinally on the boom 3, which can be moved back and forth by means of a trolley cable 8. Over the trolley 7 there can run a hoisting cable 6 with a lifting hook.

The crane 1 includes a control and/or staff cabin 9, which may be designed as a crane operator or lift cabin 10. Said control and/or staff cabin 9 is mounted in a height-adjustable manner. In particular, said crane operator's or lift cabin 10 may be mounted on the tower 2 so as to be longitudinally movable, for example by means of a cabin trolley guided on the tower profile, for example its longitudinal chords.

As shown in FIG. 1, the control and/or staff cabin 9 can be held and moved to various height positions by means of a suspension, which can engage the chassis, in particular the upper side of the crane operator's or lift cabin 10. Said cabin 10 can thereby be moved up and down on an outer side of the tower 2, for example by means of a roller guide or rail guide along the tower. If necessary, however, the cabin can also be arranged inside the tower profile, for example, if it is only used as a climbing aid to reach the boom or a control cab arranged at the top and the tower profile is sufficiently voluminous.

As FIG. 1 further shows, for example, an advertising space 11 can be mounted on the boom 3, for example in the form of a large-surface advertising panel, which can be arranged upright parallel to the longitudinal center plane of the crane, which forms the drawing plane of FIG. 1.

A control device 21, which may comprise, for example, a microprocessor, a program memory and other electronic components, controls the drive devices by means of which said crane movements may be carried out, in particular the retraction and lowering of the hoisting cable 6, the movement of the trolley 7 by means of the trolley cable 8, if necessary an upward and downward luffing of the boom 3, and the upward and downward movement of the crane operator lift cab 10, and also the actuation of a slewing gear for rotating the crane 1 about an upright axis.

Said crane controller 21 may provide, in a manner known per se, appropriate operating levers or other input means for a crane operator to control the various axes of movement of the crane.

The control device 21 further comprises a monitoring device 22 that can monitor, by means of suitable sensors, the crane loads acting on the crane, in particular the hoisting load taken up by the lifting hook and the outreach that the lifting hook or trolley 7 has with respect to the standing base of the crane. Said outreach can be determined in particular by the position of the trolley 7 on the boom 3 and, if necessary, a luffing angle of the boom 3 with respect to the horizontal.

Figure 2:
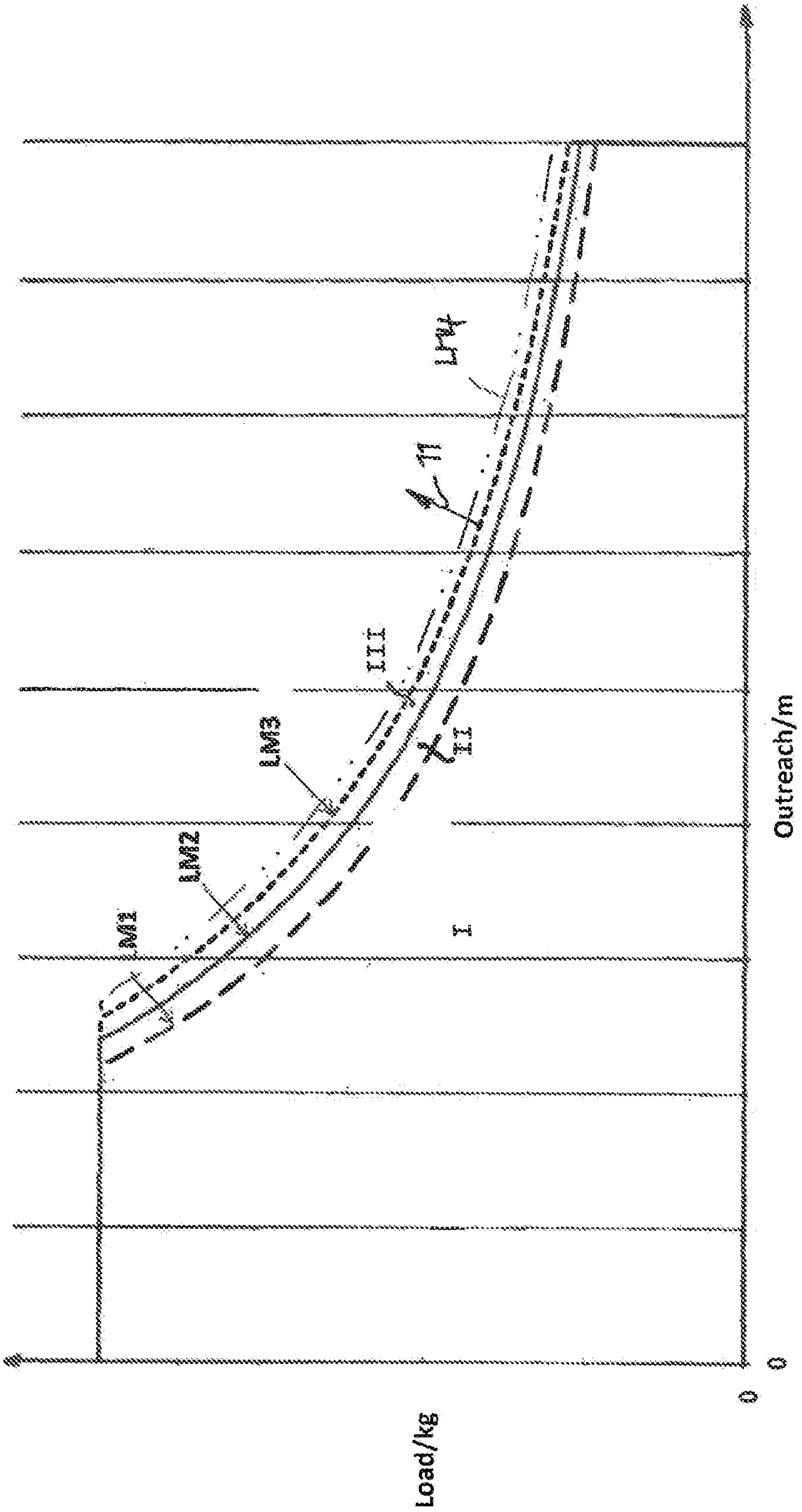

A plurality of load limits LM1, LM2, and LM3, and optionally LM4, may be implemented in said monitoring device 22, as shown in FIG. 2. The monitoring device 22 compares the current load condition with said load limit, wherein the control device 21 enables or differently limits the actuation of said drive devices depending on the load range in which the crane is currently located.

For example, as long as the crane is located in the bearing load range 1 below the limiting load curve LM1, cf. FIG. 2, several drive devices can be actuated simultaneously with relatively high or maximum drive speeds and accelerations. If the crane 1 reaches said load limit LM1 by lifting a correspondingly high hoisting load or by increasing the outreach, the crane can move beyond this load limit LM1 into the load range II, but only by switching the control device 21 accordingly and providing a reduced speed and acceleration of the drives. Said switching process can be triggered manually by the crane operator, but can also be carried out automatically by a corresponding switching device during overtravel.

If the crane operation reaches said second load limit LM2, this can also be overtravelled, wherein, however, only individual actuation of the drive devices is then possible. The corresponding switching process can also be performed manually or automatically here. For example, either only the hoist rope drive or only the trolley drive can then be actuated in the bearing load range III.

However, it is understood that the crane controller does not necessarily have to have the three different load limits LM1, LM2 and LM3 shown in FIG. 2. If necessary, it is also possible to work with only one or two load limits.

In particular, the control device 21 or the monitoring device 22 also still considers the wind resistance of the crane 1 depending on its set-up or operating state. For example, the position of the crane operator lift cabin 10 can influence the wind resistance or influence the wind torque caused by wind blowing on the cabin 10. The higher the crane operator lift cabin 10 is moved along the tower 2, the greater the tilting moment caused by wind blowing on the cabin 10.

A wind resistance detection unit 20, which can be implemented as a software module in the control device 21, can comprise position determination means 19 that can automatically detect or determine the height position of said crane operator lift cab 10.

For example, said position determination means 19 can include a sensor system 23 that can determine the distance of the crane operator lift cab 10 from the boom 3 or the upper end portion of the tower 2. However, the height position can also be determined, for example, by a sensor system assigned to the drive for height adjustment.

Alternatively, or in addition to the height position of the crane operator lift cab 10, the wind resistance detection device 20 may also include detection means 24 capable of detecting the presence of the advertising space 11 on the crane boom 3.

If such an advertising space 11 is present, the wind resistance of the crane is significantly greater than if such an advertising space 11 is not present.

The monitoring device 22 may consider the height position of the crane operator lift cab 10 and/or the presence of the advertising space 11 to shift or adjust the load limits LM1, LM2, and/or LM3, as indicated by the arrow 11 in FIG. 2. If, for example, the crane operator's cabin 10 is moved low, for example close to the ground in the area of the undercarriage 5, the monitoring device 22 can increase or push out said load limits LM1, LM2 and LM3 a little to allow for larger loads and/or outreach. Conversely, the load limits can be shifted in the opposite direction (opposite arrow 11) if the cabin 10 is moved upwards or an advertising banner 11 is attached to the boom.

Alternatively, or in addition to such a shift of said load limits, however, the monitoring device 22 may, if necessary, also consider an additional load limit LM4, for example instead of the load limit LM3, for example if said driver's cab 10 is driven in a position close to the ground and/or the advertising space 11 is not present and insofar as there is a lower wind resistance. Said load curve LM4 can then be higher than the curve LM3 which is then not considered in this case. Conversely, such a load limit LM4 can also be located below the load limit LM3 if, for example, an additional advertising banner is attached to the boom.

As noted, the monitoring device 22 may also consider the presence of the advertising space 11. If this is available, the load limits LM1 and/or LM2 and/or LM3 and/or LM4 shown in FIG. 2, for example, can be shifted downward or inward a little in order to provide for limitations of the crane movements even at lower bearing loads and/or outreach. If, however, the advertising space 11 is not present and if the detection means 24 give a signal that no such advertising space 11 is present, the monitoring device 22 can increase or shift said load limits or only one of these load limits from FIG. 2, so that higher bearing loads and/or outreach can be driven.

However, as an alternative or in addition to shifting said load limits LM1, LM2 and LM3 or applying an alternative load limit LM4, the monitoring device 22 can also adjust, in particular increase or decrease, a load limit in the form of a maximum wind speed permissible for crane operation, depending on the signal provided by the wind resistance detection unit 20. If, for example, said advertising space 11 is mounted on the boom 3 and, in addition, the operator's cabin 11 is also arranged at the upper end of the tower, the permissible maximum wind speed can be lowered.

I claim:

1. A convertible, fast-erecting tower crane comprising:

a crane controller for controlling crane movements, wherein the crane controller has a monitoring device for monitoring the stability and limiting crane movements when a load limit is reached, wherein the monitoring device has a wind resistance detection unit for detecting at least one variable wind resistance parameter which influences the wind resistance of the crane and/or the wind torque exerted by a given wind on the crane, and wherein the monitoring device is configured to change the load limit depending on the detected wind resistance parameter and/or to use different load limits depending on the detected wind resistance parameter;

a position-variable control and/or staff cabin; and a position determiner, wherein the control and/or staff cabin and the position determiner are configured for determining the position of the control and/or staff cabin, and wherein the monitoring device is configured for adjusting the load limit and/or for selecting different load limits depending on the determined position of the control and/or staff cabin.

2. The crane of claim 1, wherein the wind resistance detection unit comprises the position determiner for determining the position of the position-variable control and/or staff cabin relevant for the wind resistance on the crane, and wherein the monitoring device is configured to adjust the load limits and/or to select different load limits depending on the determined position of the position-variable control and/or staff cabin relevant for the wind resistance.

3. The crane of claim 2, wherein the position determiner comprises a height determiner determining the height of the position-variable control and/or staff cabin relevant to wind and/or the distance of the position-variable control and/or staff cabin relevant to wind from a tilt axis of the crane, wherein the monitoring device is configured to adjust the load limit and/or to select different load limits depending on the determined height and/or the determined tilt axis distance.

4. The crane of claim 3, wherein the monitoring device is configured to decrease the load limit and/or to select a lower load limit as the height and/or tilt axis distance increases.

5. The crane of claim 1, wherein the position determiner comprises a height determiner, and wherein the control and/or staff cabin and the height determiner are configured to determine a height of the control and/or staff cabin.

6. The crane of claim 1, wherein the control and/or staff cabin is height-adjustable.

7. The crane of claim 1, wherein the monitoring device is configured for adjusting the load limit and/or for selecting different load limits depending on a determined height of the control and/or staff cabin.

8. The crane of claim 1, wherein the wind resistance detection unit comprises an accessory mounting surface determiner for detecting accessory mounting surfaces to be mounted on the crane and/or for detecting the position of such accessory mounting surfaces, wherein the monitoring device is configured for adjusting the load limit and/or for selecting different load limits depending on a signal from the accessory mounting surface determiner.

9. The crane of claim 8, wherein the accessory mounting surface determiner is configured to detect an accessory mounting surface and/or the position or positions of the accessory mounting surface on the crane.

10. The crane of claim 9, wherein accessory mounting surface comprises a surface of an upright advertising panel, and/or the position or positions of the accessory mounting surface comprises the position or positions of the surface of the upright advertising panel.

11. The crane of claim 9, wherein the accessory mounting surface determiner is configured to determine an inclination of the accessory mounting surface with respect to a vertical and/or with respect to an upright longitudinal central plane of the crane, and wherein the monitoring device is configured to change the load limit and/or to select different load limits depending on the determined inclination of the accessory mounting surface.

12. The crane of claim 8, wherein the accessory mounting surface determiner is configured to determine an inclination of the accessory mounting surface with respect to a vertical and/or with respect to an upright longitudinal central plane of the crane, wherein the monitoring device is configured to change the load limit and/or to select different load limits depending on the determined inclination of the accessory mounting surface.

13. The crane of claim 1, wherein the load limit to be adjusted by the monitoring device comprises a bearing load curve, and wherein the bearing load curve specifies bearing load limit values depending on the load, and/or a lifting torque limit and/or a bearing load limit.

14. The crane of claim 1, wherein the load limit to be adjusted by the monitoring device comprises a limit for a maximum permissible wind speed.

15. The crane of claim 1, wherein the monitoring device is configured to operate at least semi-automatically and adjust the load limit at least semi-automatically depending on a signal from the wind resistance detection unit.

16. The crane of claim 15, wherein the monitoring device is configured to operate fully automatically and adjust the load limit fully automatically depending on a signal from the wind resistance detection unit.

17. A convertible, fast-erecting tower crane comprising:

a crane controller for controlling crane movements, wherein the crane controller has a monitoring device for monitoring the stability and limiting crane movements when a load limit is reached, wherein the monitoring device has a wind resistance detection unit for detecting at least one variable wind resistance parameter which influences the wind resistance of the crane and/or the wind torque exerted by a given wind on the crane, and wherein the monitoring device is configured to change the load limit depending on the detected wind resistance parameter and/or to use different load limits depending on the detected wind resistance parameter; and wherein the wind resistance detection unit comprises an accessory mounting surface determiner for detecting accessory mounting surfaces to be mounted on the crane and/or for detecting the position of such accessory mounting surfaces, wherein the monitoring device is configured for adjusting the load limit and/or for selecting different load limits depending on a signal from the accessory mounting surface determiner.

18. A convertible, fast-erecting tower crane comprising:

a crane controller for controlling crane movements, wherein the crane controller has a monitoring device for monitoring the stability and limiting crane movements when a load limit is reached, wherein the monitoring device has a wind resistance detection unit for detecting at least one variable wind resistance parameter which influences the wind resistance of the crane and/or the wind torque exerted by a given wind on the crane, and wherein the monitoring device is configured to change the load limit depending on the detected wind resistance parameter and/or to use different load limits depending on the detected wind resistance parameter; and wherein the load limit to be adjusted by the monitoring device comprises a bearing load curve, and wherein the bearing load curve specifies bearing load limit values depending on the load, and/or a lifting torque limit and/or a bearing load limit.

* * * * *